US006807166B1

(12) United States Patent
Ohura

(10) Patent No.: US 6,807,166 B1
(45) Date of Patent: Oct. 19, 2004

(54) GATEWAY FOR INTERNET TELEPHONE

(75) Inventor: Hitoshi Ohura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/243,351

(22) Filed: Feb. 1, 1999

(30) Foreign Application Priority Data

Aug. 5, 1998 (JP) .......................... 10-222017

(51) Int. Cl.$^7$ .................... H04L 12/66; H04L 12/28
(52) U.S. Cl. .................. 370/352; 370/401; 379/88.17
(58) Field of Search ............................. 370/351–356, 370/401, 475, 395, 52; 379/88.17, 93.01, 93.07, 265.09

(56) References Cited

U.S. PATENT DOCUMENTS

| | | | | |
|---|---|---|---|---|
| 5,848,143 | A | * 12/1998 | Andrews et al. ............. | 379/219 |
| 6,104,711 | A | *  8/2000 | Voit ............................ | 370/352 |
| 6,157,636 | A | * 12/2000 | Voit et al. .................... | 370/353 |
| 6,167,043 | A | * 12/2000 | Frantz ......................... | 370/356 |
| 6,205,139 | B1 | *  3/2001 | Voit ............................ | 370/389 |
| 6,233,234 | B1 | *  5/2001 | Curry et al. ................. | 370/356 |
| 6,243,374 | B1 | *  6/2001 | White et al. ................. | 370/352 |
| 6,347,085 | B2 | *  2/2002 | Kelly .......................... | 370/352 |

FOREIGN PATENT DOCUMENTS

| | | |
|---|---|---|
| JP | 6-224901 | 8/1994 |
| JP | 9-168065 | 6/1997 |
| JP | 10-98495 | 4/1998 |
| WO | 97/47119 | 12/1997 |

* cited by examiner

Primary Examiner—Alpus H. Hsu
Assistant Examiner—Toan D. Nguyen
(74) Attorney, Agent, or Firm—Katten Muchin Zavis Rosenman

(57) ABSTRACT

A gateway for an internet telephone system manages calls to and from personal computers and enables the personal computers to use the internet telephone system with an IP address assigned by a DHCP server or a private IP address. The gateway has a LAN receiver for processing an incoming call from the Internet or a personal computer, a line transmitter for processing an outgoing call to a telephone according to a request from the LAN receiver, a line receiver for processing an incoming call from a telephone, a LAN transmitter for processing an outgoing call to the Internet or a personal computer according to a request from the line receiver, and a logger for logging information about calls according to requests from the LAN transmitter and line transmitter. If the LAN receiver receives an incoming call from a LAN and if the incoming call accompanies an IP address as a receiver address, the LAN receiver requests the LAN transmitter to make a call based on the incoming call, and the LAN transmitter requests the logger to log information about the call.

18 Claims, 16 Drawing Sheets

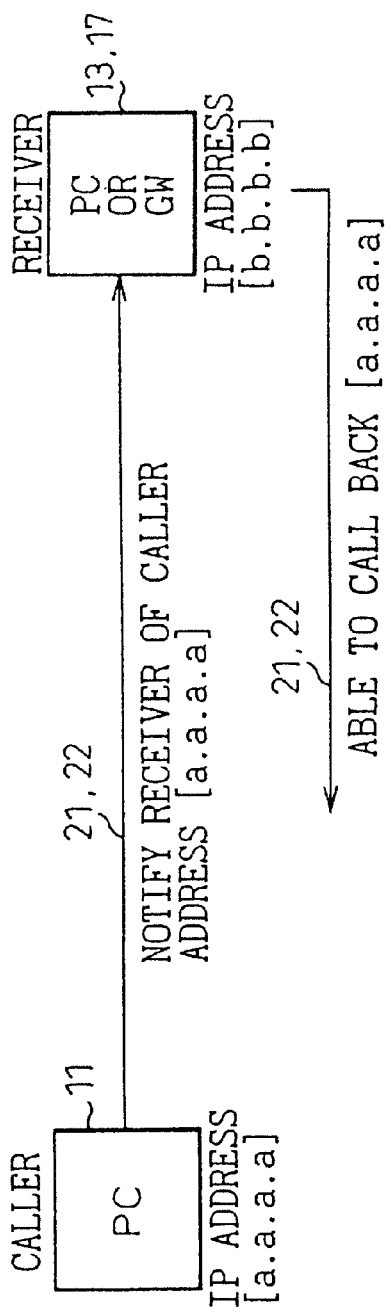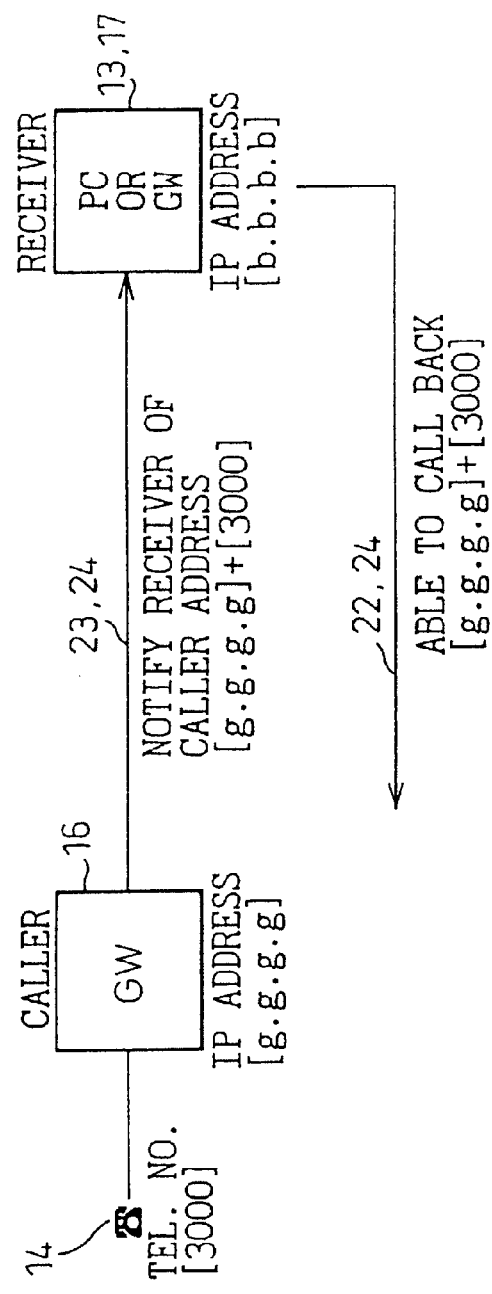

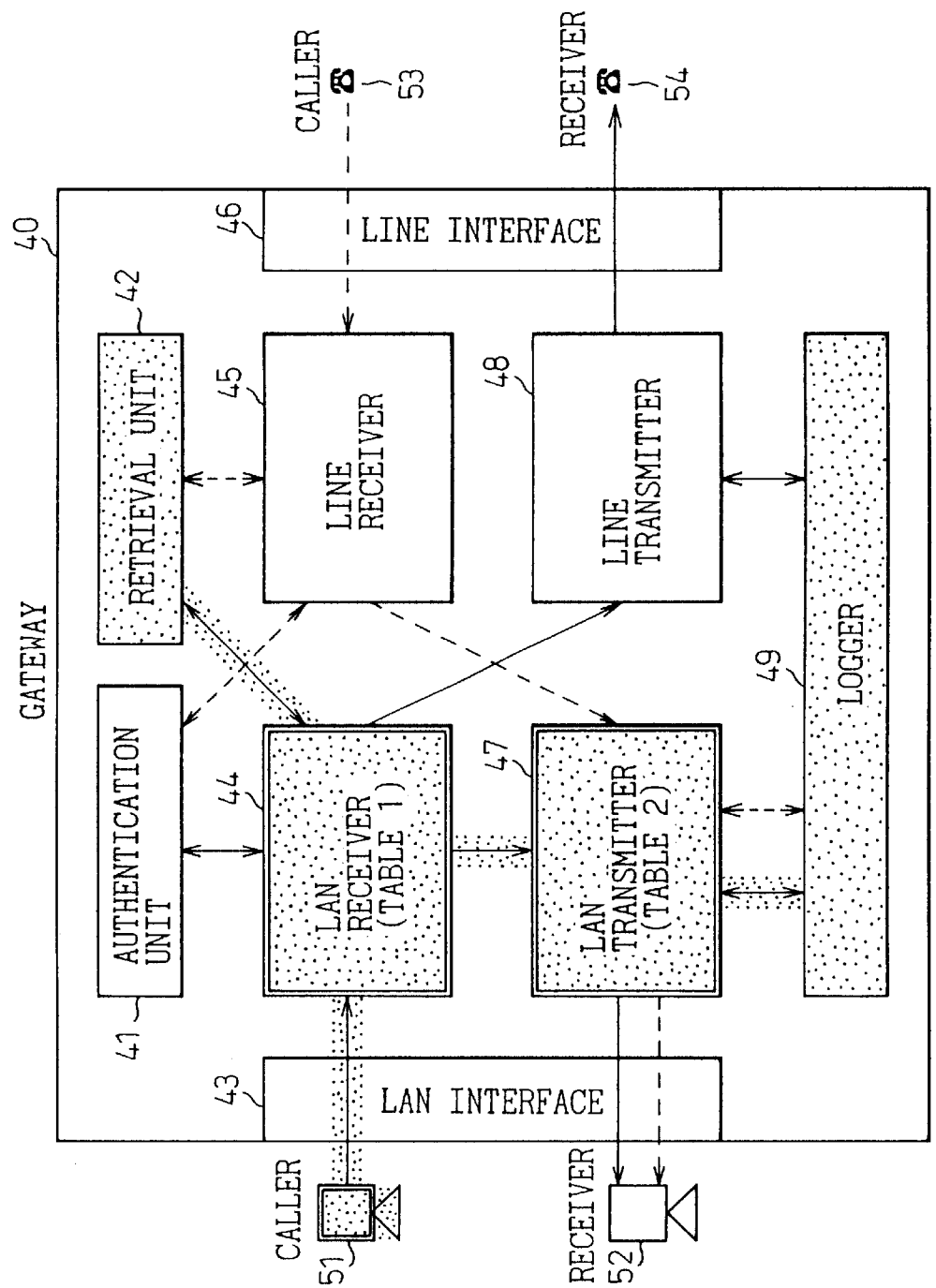

Fig.5A

| TEL. NO. | IP ADDRESS OF PC | RECEPTION STATE |
|---|---|---|
| 1100 | 133.162.119.1 | ENABLED |
| 1200 | — | — |
| ----- | ----- | ----- |

Fig.5B

| IP ADDRESS | TEL. NO. |
|---|---|
| 133.162.119.1 | 1100 |
| 133.162.119.2 | 1200 |
| ----- | ----- |

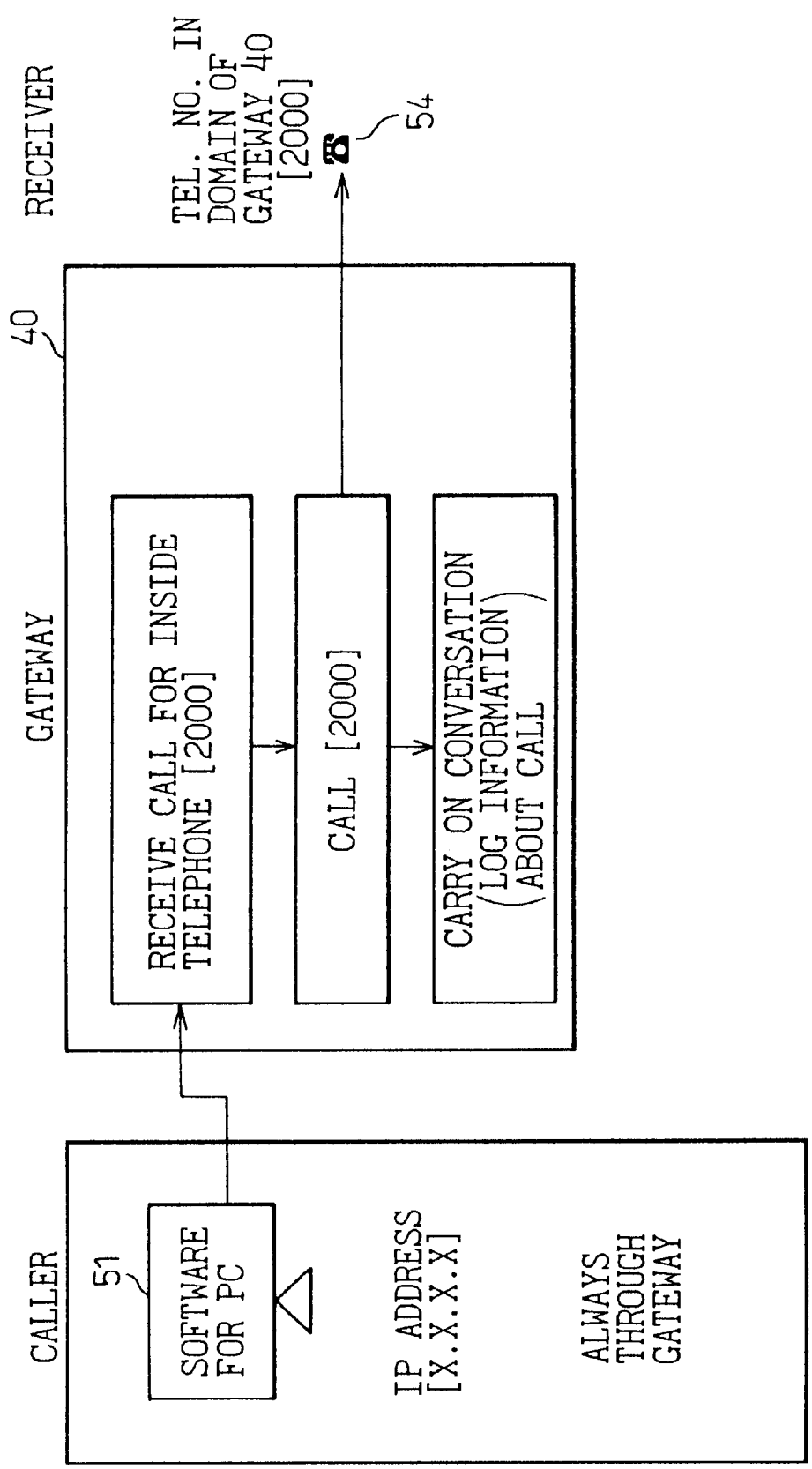

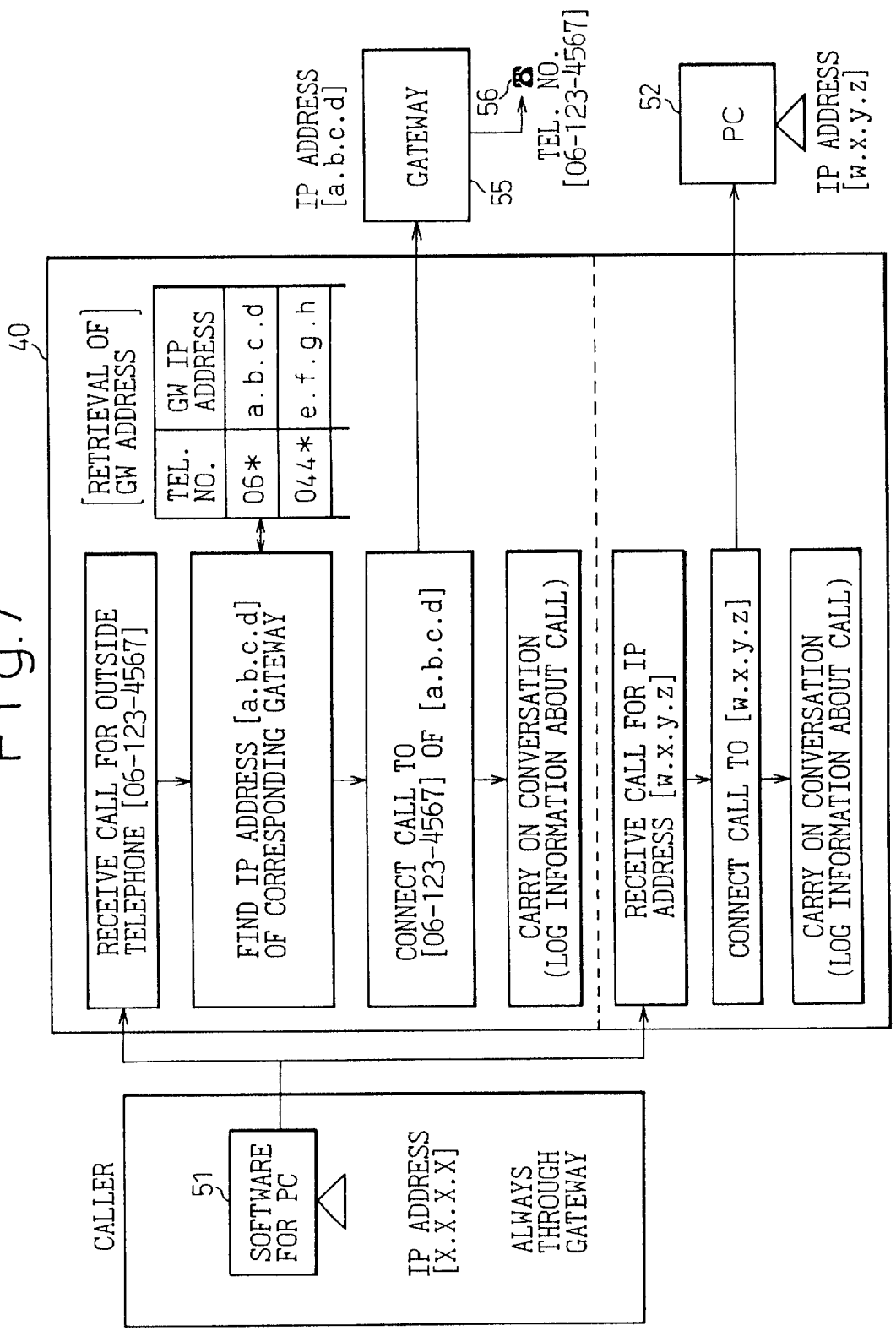

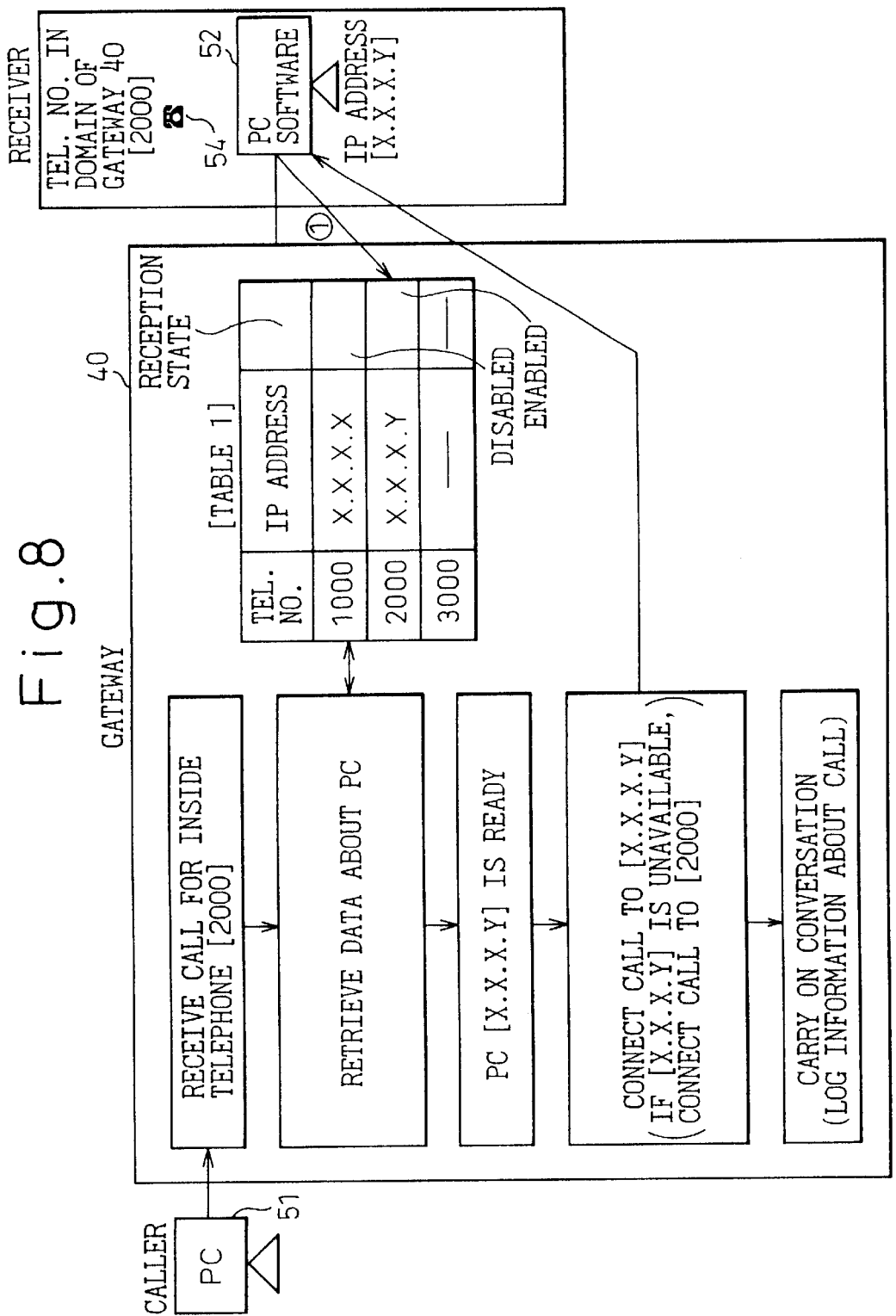

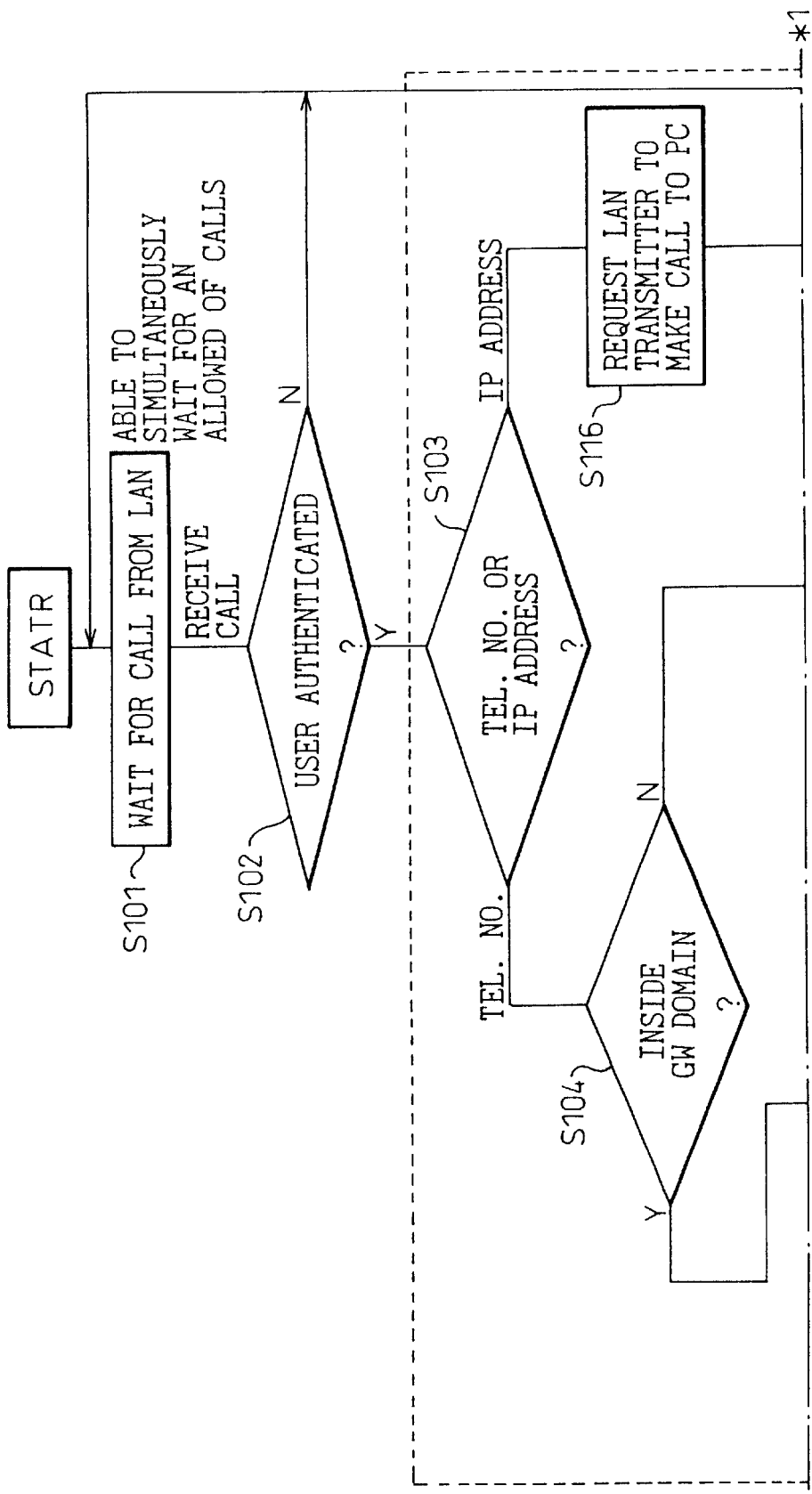

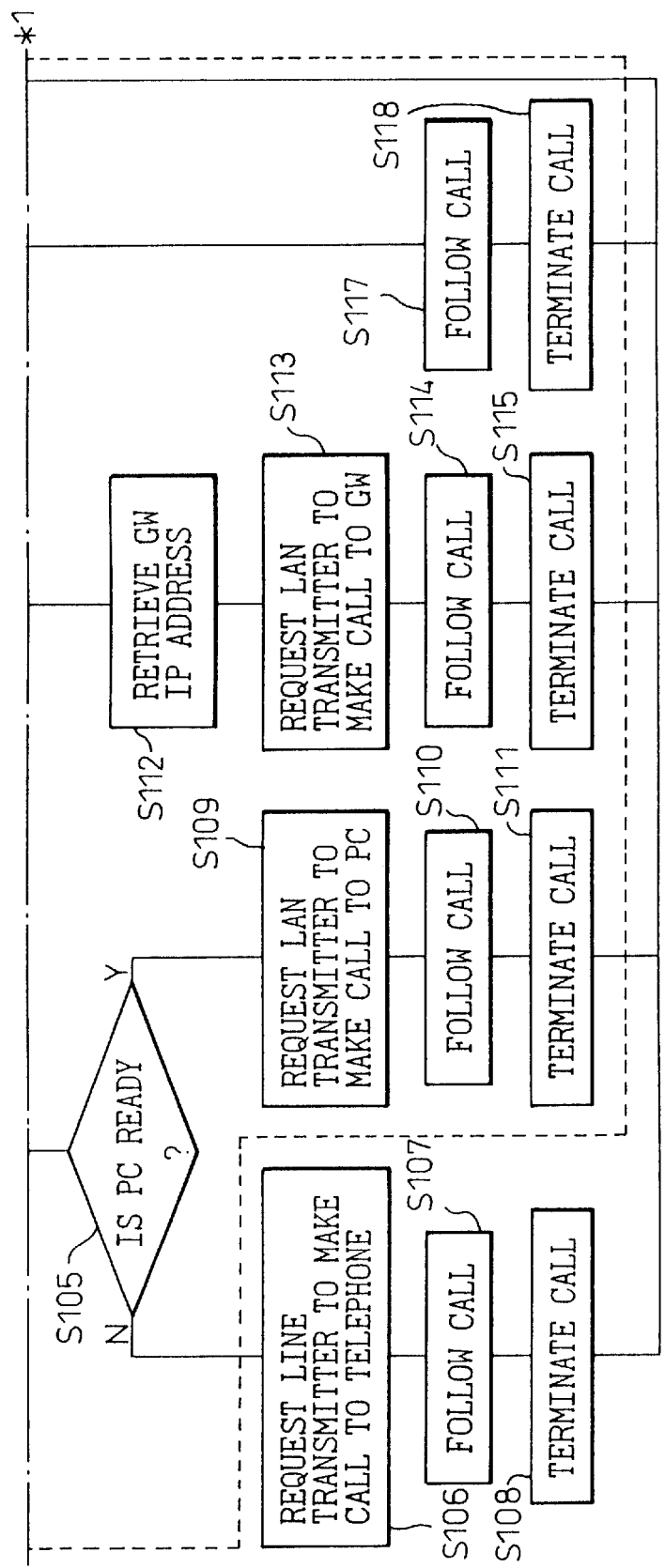

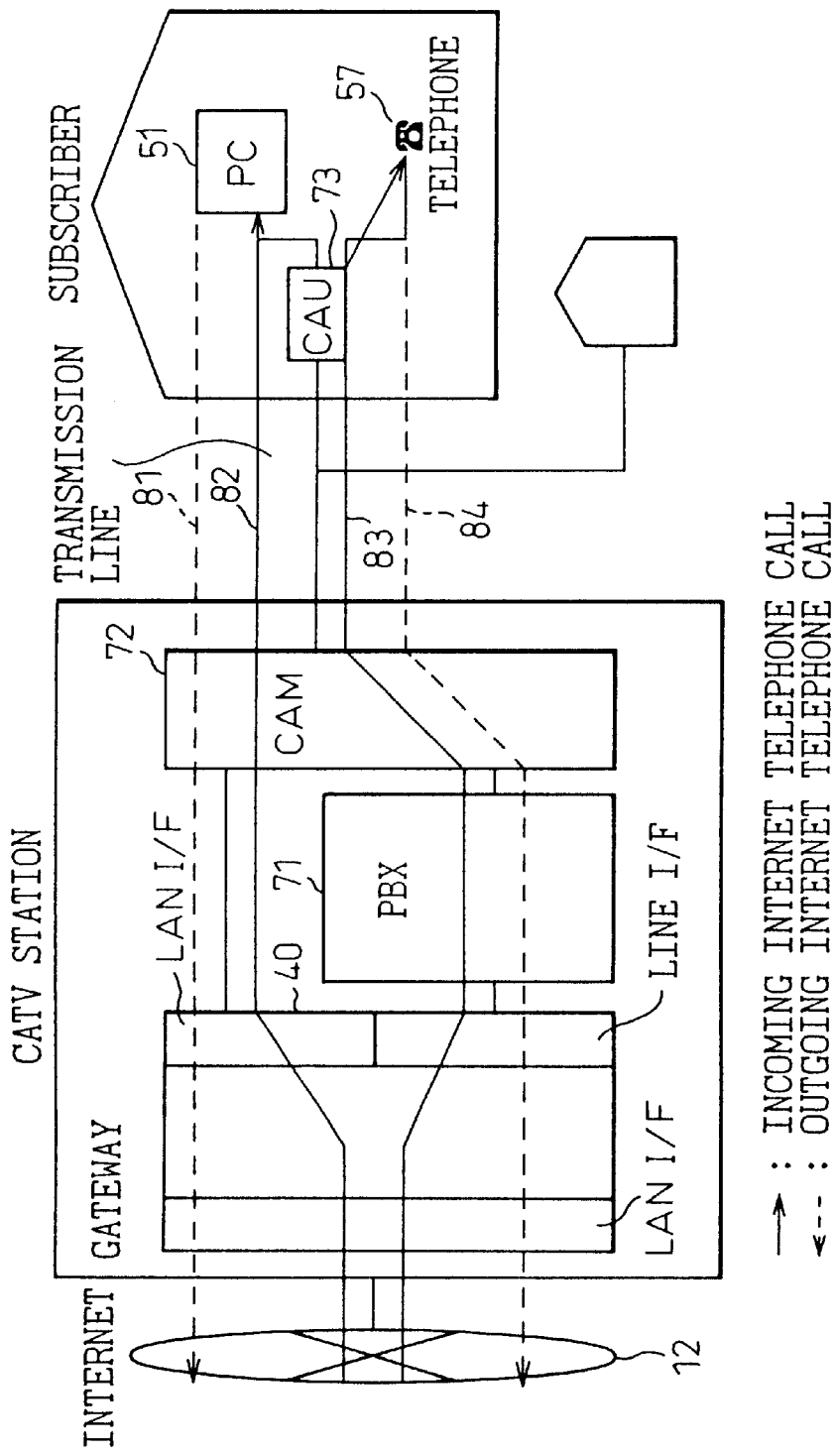

GATEWAY FOR INTERNET TELEPHONE

BACKGROUND OF THE INVENTION

1. Field of the Invention

The present invention relates to a gateway, and particularly, to a gateway for an internet telephone system and software installed in terminals connected to the gateway.

2. Description of the Related Art

FIG. 1 shows an internet telephone system.

An end user of the internet telephone system employs a personal computer (hereinafter referred to as PC) or a telephone. There are four patterns of terminal-to-terminal connection in the internet telephone system:

1) PC→PC (21)
2) PC→gateway→telephone (22)
3) telephone→gateway→PC (23)
4) telephone→gateway→gateway→telephone (24)

The PCs 11 and 13 must have software such as Netmeeting (registered trademark) to use the internet telephone system. The public telephones 14 and 19 must have the gateways (GWs) 16 and 17 to use the internet telephone system. The gateways 16 and 17 are installed in, for example provider centers and are connected to telephone networks 15 and 18, to carry out conversion between voice signals and packet signals and connections between the telephone networks 15 and 18 and the Internet 12.

Internet telephone software and gateways have been based on individual specifications devised by their producers. As a result, the use of the internet telephone system is restricted to parties that employ the same software and apparatuses. Recently, VoIP (Voice over the Internet Protocol Forum) started to standardize internet telephone connection among different software and apparatuses and proposed Recommendation H.323 as a standardization base.

ITU-T (International Telecommunication Union Telecommunication Standardization Sector) employs the Recommendation H.323 as an international standard for "Visual Telephone System and Apparatus for Service Quality Unguaranteed LAN" ("ITU-T H Series (related to audio, visual, and multimedia) Recommendations (Part 2)" issued by Zaidan Hojin Sin-Nippon ITU Kyokai). The Recommendation H.323 calls a PC having the above-mentioned software an "H.323 terminal" and the above-mentioned gateway "H.323 gateway" or simply "gateway."

Japanese Unexamined Patent Publication No. 09-168065 discloses a technique to use the internet telephone system of FIG. 1. This technique arranges a database in a server. The database relates user names, internet protocol (IP) addresses, and telephone numbers to one another. A call contains a receiver IP address. If a PC corresponding to the receiver IP address is unavailable to receive the call, or if internet telephone software installed in the PC is inactive, a telephone number corresponding to the PC is retrieved from the database, and the call is automatically connected to the telephone.

FIGS. 2A and 2B show examples of connection and callback operations in the internet telephone system of FIG. 1. The example of FIG. 2A shows the route 21 or 22 of FIG. 1, and the example of FIG. 2B shows the route 23 or 24 of FIG. 1.

In FIG. 2A, the PC 11 serves as a caller and has an IP address [a.a.a.a], and the PC 13 or gateway 17 serves as a receiver and has an IP address [b.b.b.b]. The PC 11 sends the IP address [a.a.a.a] to the PC 13 or gateway 17. The PC 13 or gateway 17 makes a callback with the IP address [a.a.a.a] of the caller.

In FIG. 2B, the telephone 14 has a telephone number [3000]. When the telephone 14 makes a call, the gateway 16 having an IP address [g.g.g.g] sends the IP address [g.g.g.g] and telephone number [3000] to the PC 13 or gateway 17. The PC 13 or gateway 17 makes a callback with the caller IP address [g.g.g.g] and telephone number [3000].

In these examples, the IP addresses are global IP addresses so that the PCs 11 and 13 and gateways 16 and 17 are uniquely identifiable. The receivers 13 and 17 are able to correctly specify the callers 11 and 14 when making a callback As is apparent in the routes 21 and 22, the PC 11, for example, is directly connected to the Internet 12, and therefore, the PC 11 separately keeps a log of internet telephone calls. If a party uses the internet telephone system with many PCs, it is difficult for the party to centrally grasp the use by the PCs of the internet telephone system.

There is a serious shortage of global IP addresses these days. To solve this problem, DHCP (Dynamic Host Configuration Protocol) and private IP addresses are increasingly used. A DHCP server dynamically (instead of fixedly) assigns a global IP address (only one in the world) to a PC when the PC is activated. On the other hand, the private IP addresses are fixedly assigned to PCs in a private LAN and are usable only within the LAN. The private IP addresses are prohibited from being disclosed to the Internet that is public.

As a result, an outside party is unable to call through the internet telephone system a PC in the LAN that employs DHCP or private IP addresses.

In addition, a PC in the LAN that employs private IP addresses is unable to call an outside party through the internet telephone system because the private IP addresses are not allowed to be transmitted as caller addresses to the outside. A PC in the LAN that uses DHCP may call an outside party through the internet telephone system because it is temporarily provided with a global IP address from a DHCP server. The outside party, however, is unable to make a callback because the IP address is temporary.

SUMMARY OF THE INVENTION

An object of the present invention is to provide a gateway for an internet telephone system, capable of 1) efficiently managing PCs and telephones connected to private networks so that they may use the internet telephone system and 2) enabling PCs and telephones that have DHCP IP addresses or private IP addresses to use the internet telephone system In order to accomplish the objects, the present invention provides a gateway for an internet telephone system, having a LAN receiver for processing an incoming call from the Internet or a PC, a line receiver for processing an incoming call from a telephone, a LAN transmitter for processing an outgoing call to the Internet or a PC according to a request from the line receiver, a line transmitter for processing an outgoing call to a telephone according to a request from the LAN receiver, a retrieval unit for retrieving the address of a receiver gateway according to a request from the line receiver, and a logger for logging information about calls according to requests from the LAN transmitter and line transmitter.

If the LAN receiver receives an incoming call from a LAN and if the incoming call accompanies a receiver IP address, the LAN receiver requests the LAN transmitter to make a call based on the incoming call, and the LAN transmitter requests the logger to log information about the call.

If the LAN receiver receives an incoming call from a LAN and if the incoming call accompanies a receiver telephone number that is outside the domain of the gateway, the LAN receiver retrieves an IP address assigned to a gateway corresponding to the receiver telephone number from the retrieval unit and requests the LAN transmitter to make a call based on the incoming call and retrieved gateway IP address.

The LAN receiver has a first table for registering IP addresses assigned to PCs that are within the domain of the gateway, telephone numbers corresponding to the PCs, and reception enabled/disabled states of the PCs. If the LAN receives an incoming call from a LAN and if the incoming call accompanies a receiver telephone number that is within the domain of the gateway, the LAN receiver retrieves an IP address assigned to a PC corresponding to the receiver telephone number from the first table, and if the PC is in a reception enabled state, requests the LAN transmitter to make a call based on the incoming call and retrieved IP address.

If the PC is in a reception disabled state or fails to receive the call, the LAN receiver requests the line transmitter to make a call based on the incoming call and accompanied receiver telephone number. An IP address assigned to any PC that is within the domain of the gateway is one assigned by a DHCP server or is a private IP address.

Receiving an IP address from the DHCP server, a PC in the domain of the gateway notifies the gateway of the IP address and a telephone number related to the PC so that the gateway may register the IP address and telephone number in the first table. Each PC in the domain of the gateway notifies the gateway of the enabled/disabled state of internet telephone software installed in the PC whenever it is enabled or disabled.

The LAN transmitter has a second table for registering IP addresses assigned to PCs that are within the domain of the gateway and telephone numbers corresponding to the PCs. If the LAN transmitter receives a call request from the LAN receiver and if the request accompanies a caller IP address that is not a global IP address, the LAN transmitter retrieves a telephone number corresponding to the caller IP address from the second table and replaces the caller IP address with an IP address assigned to the gateway plus the retrieved telephone number.

The caller IP address may be an IP address assigned by the DHCP server or a private IP address. Receiving an IP address from the DHCP server, a PC in the domain of the gateway notifies the gateway of the IP address and a telephone number related to the PC so that the gateway may register the IP address and telephone number in the second table. According to the present invention, every call from every PC is made through the gateway.

BRIEF DESCRIPTION OF THE DRAWINGS

The present invention will be more clearly understood from the description as set forth below with reference to the accompanying drawings, in which:

FIGS. 2A and 2B show connection and callback operations in the internet telephone system of FIG. 1;

FIG. 4 shows a basic structure of a gateway according to the present invention;

FIGS. 5A and 5B show tables employed by the gateway of FIG. 4;

FIG. 6 shows the operation of the gateway of FIG. 4 when handling an incoming call to a telephone that is within the domain of the gateway;

FIG. 7 shows the operation of the gateway of FIG. 4 when handling incoming calls to a telephone and PC that are outside the domain of the gateway;

FIG. 8 shows the operation of the gateway of FIG. 4 when handling an incoming call to a PC that is within the domain of the gateway;

FIGS. 12A and 12B show a process flow of a LAN receiver of the gateway of FIG. 4;

FIG. 15 shows a CATV station employing the gateway of the present invention.

DESCRIPTION OF THE PREFERRED EMBODIMENTS

Figure 1:
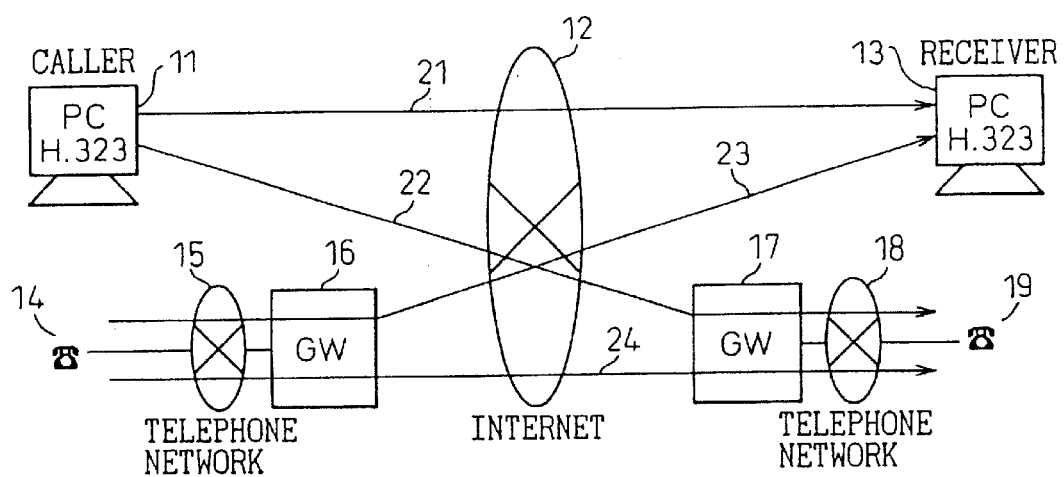
FIG. 1 shows an internet telephone system according to the prior art.
Figure 3:
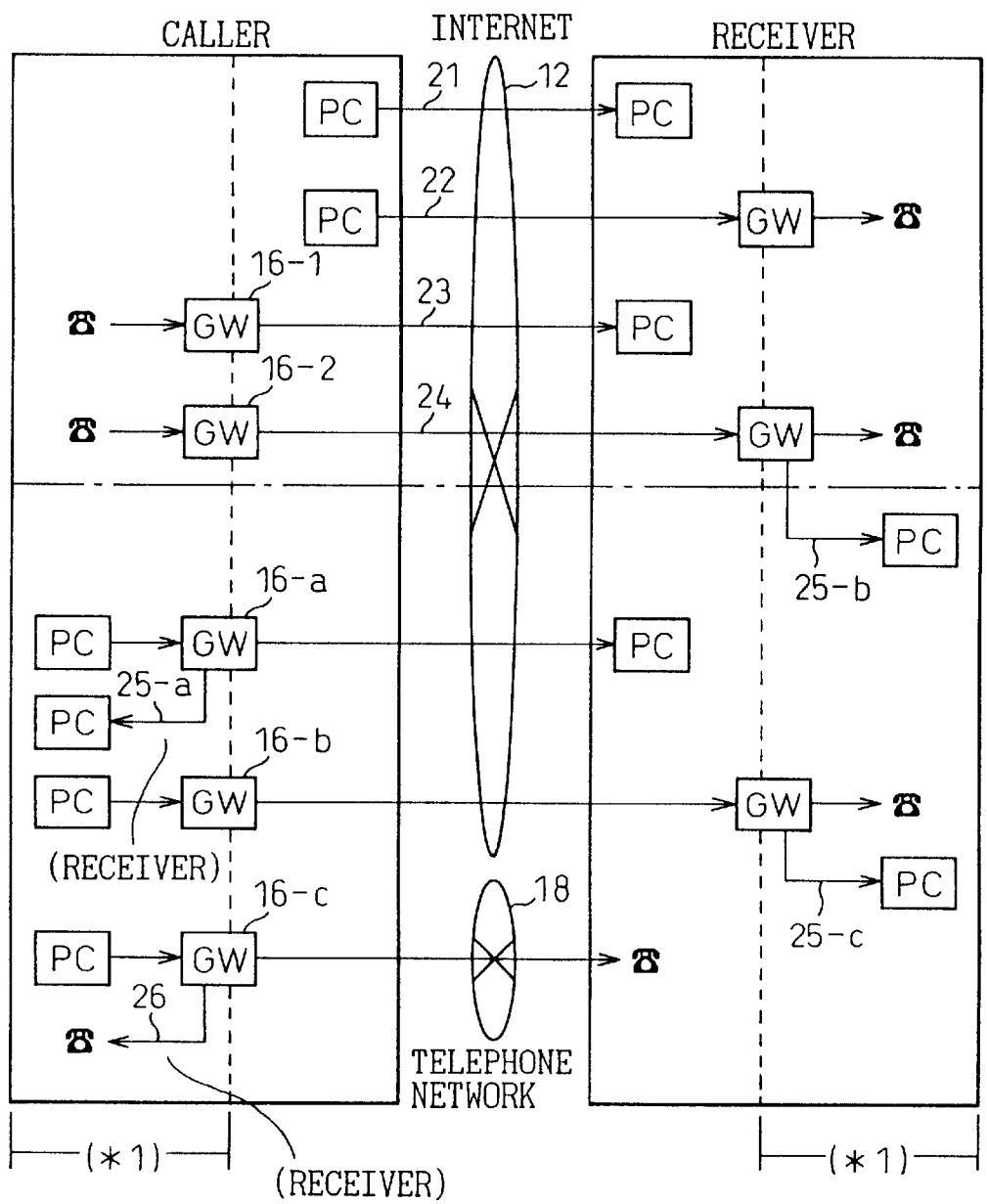
FIG. 3 shows an internet telephone system employing gateways according to the present invention.

FIG. 3 shows an internet telephone system employing gateways according to the present invention and connections between caller terminals and receiver terminals in the system.

A part above a dot-and-dash line corresponds to a conventional connection scheme, and a part below the line shows a connection scheme characteristic of the present invention. The scheme characteristic to the present invention will be explained.

The present invention connects a PC serving as a caller to an external network 12 or 18 always through one of gateways 16-*a* to 16-*c*, to centrally control the use by PCs of the internet telephone system. Although the gateways are connected to PCs in a one-to-one manner in FIG. 3 for the sake of explanation, the gateways 16-*a* to 16-*c*, 16-1, and 16-2 may be integrated into one gateway.

Unlike the prior art, the present invention is capable of realizing a LAN-to-LAN connection. Namely, the present invention can connect a PC to a gateway, and then, from the gateway to a PC as indicated with 25-*a*, 25-*b*, and 25-*c*. This means that the gateway of the present invention has a router function. The caller side and the receiver side each involve a private network area indicated with (*1) and, in the private network area, there is no need to assign fixed global IP addresses to PCs. Instead, private IP addresses are assigned to the PCs, and the PCs can use the internet telephone system with the private IP addresses.

FIG. 4 shows a basic structure of the gateway 40 of the present invention for the internet telephone system, and FIGS. 5A and 5B show tables 1 and 2 used by the gateway 40.

FIGS. 6 to 9 show the operation of the gateway 40.

The operation of the gateway 40 of achieving conventional functions (above the dot-and-dash line of FIG. 3) will be explained.

An incoming call from the Internet arrives at a LAN interface 43 and is processed as indicated with continuous arrow marks in FIG. 4. The incoming call is transferred to a LAN receiver 44, and a user related to the incoming call is authenticated in an authentication unit 41 in which users are registered in advance. The LAN receiver 44 requests a line transmitter 48 to make a call based on the incoming call, and the line transmitter 48 makes a call to a telephone linked to the receiver of the incoming call. A logger 49 logs information about the call after the completion of the call.

An incoming call from a line arrives at a line interface 46 and is processed as indicated with dotted arrow marks. The incoming call is transferred to a line receiver 45, and a user related to the incoming call is authenticated in the authentication unit 41. If a receiver of the incoming call is a telephone number, an address of a gateway that manages the telephone number is retrieved from a retrieval unit 42 according to the telephone number. The line receiver 45 requests a LAN transmitter 47 to make a call based on the incoming call and retrieved gateway address. The LAN transmitter 47 makes a call to the gateway address. The logger 49 logs information about the call after the completion of the call.

The operation of functional parts (shaded parts in FIG. 4) characteristic to the present invention will be explained.

According to the present invention, at least a caller (a PC 51 in FIG. 4) must use the gateway 40 of the present invention when making a call through the internet telephone system. The gateway 40 processes the call depending on a receiver (a telephone number or an IP address) of the call. The logger 49 logs information about the call.

FIG. 6 shows the operation of the gateway 40 when handling an incoming call to a telephone that is within the domain of the gateway 40.

The LAN receiver 44 receives the incoming call from a PC 51. The authentication unit 41 authenticates a user related to the incoming call. If a receiver of the incoming call is a telephone number [2000] that is within the domain of the gateway 40, the LAN receiver 44 requests the line transmitter 48 to make a call based on the incoming call. The line transmitter 48 connects the call to a telephone 54 having the telephone number [2000]. On the completion of the call, the logger 49 logs information about the call.

FIG. 7 shows the operation of the gateway 40 when handling incoming calls to a telephone and PC that are outside the domain of the gateway 40.

A part above a dotted line of FIG. 7 relates to the handling of an incoming call to a telephone number that is outside the domain of the gateway 40. The LAN receiver 44 receives the incoming call from a PC 51. The incoming call has a receiver telephone number [06-123-4567] that is outside the domain of the gateway 40. The LAN receiver 44 retrieves an IP address [a.b.c.d] assigned to a gateway that manages a station number [06] from the retrieval unit 42.

The LAN receiver 44 requests the LAN transmitter 47 to make a connection to a telephone 56 having the telephone number [123-4567] in the domain of the gateway 55 having the IP address [a.b.c.d]. The LAN transmitter 47 makes a call according to the request. After the completion of the call, the logger 49 logs information about the call.

A part below the dotted line of FIG. 7 relates to the handling of an incoming-call to an IP address that is outside the domain of the gateway 40. The LAN receiver 44 receives the incoming call from the PC 51. The incoming call has a receiver IP address [w.x.y.z] assigned to a PC 52 that is outside the domain of the gateway 40. The LAN receiver 44 requests the LAN transmitter 47 to make a connection to the PC 52 having the IP address [w.x.y.z]. The LAN transmitter 47 makes the connection, and after the completion of the call, the logger 49 logs information about the call FIG. 8 shows the operation of the gateway 40 when handling an incoming call to a PC that is within the domain of the gateway 40.

An incoming call to a telephone 54 that is within the domain of the gateway 40 arrives from a PC 51. The gateway 40 switches the call to a PC 52 because the PC 52 is related to the telephone 54 in the gateway 40.

Before this switching operation, the following a) and b) must be completed:
  a) After starting internet telephone software, the PC 52 must notify the gateway 40 of an IP address [X.X.X.Y] assigned to the PC 52, the telephone number [2000] of the telephone 52 related to the PC 52, and a reception enabled state established by the activation of the software.
  b) The notification is received by the LAN receiver 44, which registers the contents of the notification in the table 1 of FIG. 5A.

In the case of FIG. 6, the gateway 40 directly calls the telephone 54 in response to the incoming call with the telephone number [2000]. In the case of FIG. 8, the LAN receiver 44 refers to the table 1 to see if the telephone number [2000] attached to the incoming call is related to a PC and if the PC is in a reception enabled state. If there is a related PC and if the PC is available, the LAN receiver 44 retrieves an IP address [X.X.X.Y] assigned to the PC and requests the LAN transmitter 47 to make a connection to the PC 52 having the IP address [X.X.X.Y] like the case below the dotted line of FIG. 7. If the PC 52 is in a reception disabled state or if the connection to the PC 52 is unsuccessful, the line transmitter 48 calls the telephone 54 according to the telephone number [2000] like the case of FIG. 6. The logger 49 logs information about the call.

In this way, any incoming call from the outside (the Internet) is received through the gateway 40 of the present invention so that an outside party may directly make an internet telephone call through the Internet to any PC that is within the domain of the gateway 40 and that has an IP address assigned by a DHCP server or a private IP address.

Figure 9:
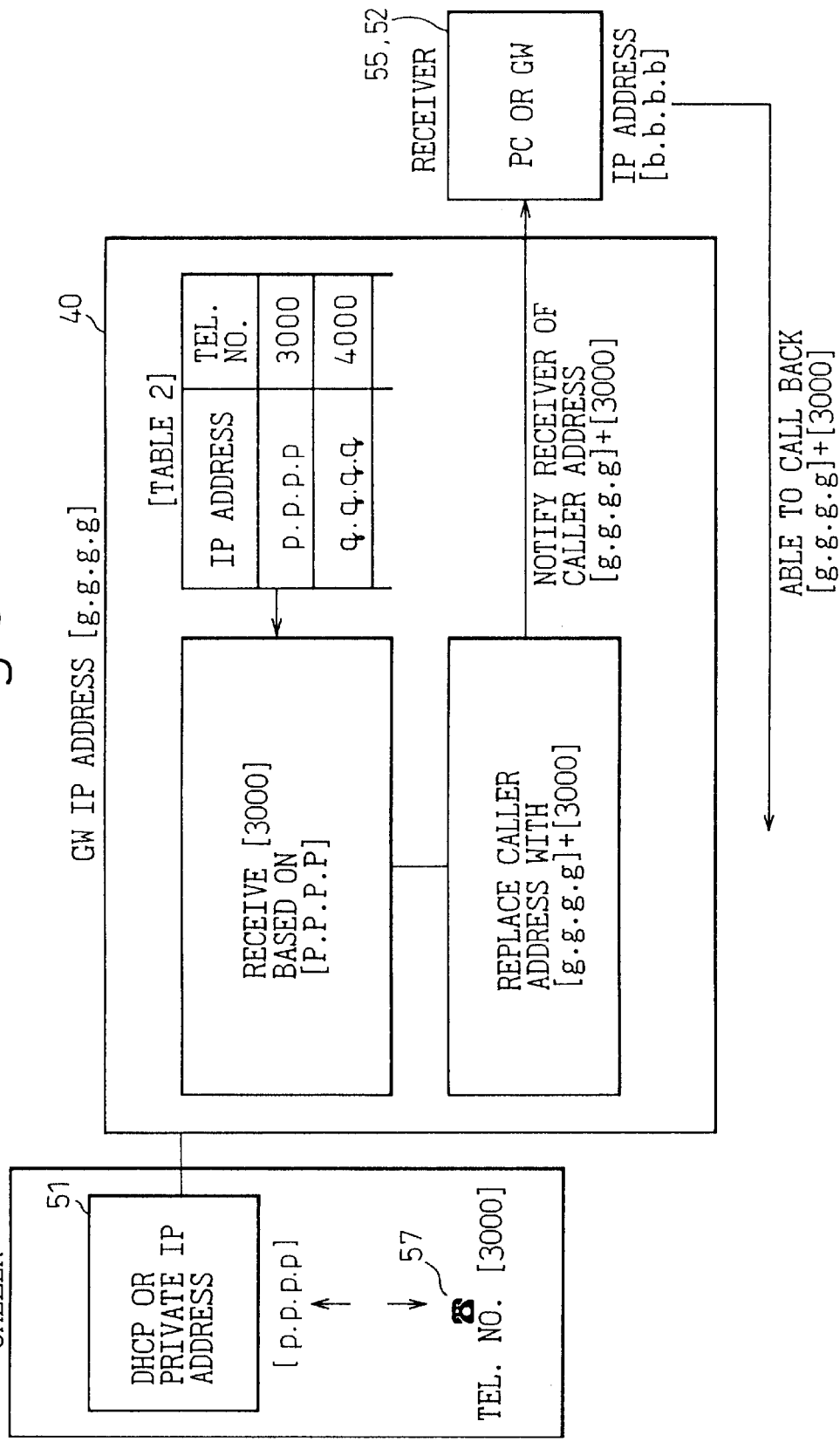
FIG. 9 shows the operation of the gateway of FIG. 4 when handling an outgoing call from a PC.

FIG. 9 shows the operation of the gateway 40 when handling an outgoing call from a PC that is within the domain of the gateway 40.

A PC 51 in the domain of the gateway 40 issues an outgoing call whose receiver is a gateway 55 or PC 52 that are outside the domain of the gateway 40, through the Internet, and the receiver makes a callback.

In the prior art of FIGS. 2A and 2B, a direct call from the PC 11 accompanies the global IP address [a.a.a.a] assigned to the PC 11 as a caller address, and a call from the telephone 14 made through the gateway 16 accompanies the global IP address assigned to the gateway 16 and the telephone number of the telephone 14, i.e., [g.g.g.g]+[3000].

On the other hand, the present invention of FIG. 9 works as follows:
  a) The caller PC 51 is in a private network and has an IP address assigned by a DHCP server or a private IP address instead of a global IP address.
  b) The PC 51 has a corresponding telephone 57 having a telephone number [3000].
  c) When activated, the PC 51 notifies the gateway 40 of the IP address assigned by the DHCP server.

The gateway 40 registers the notified IP address and the telephone number [3000] of the telephone 57 corresponding to the PC 51 in the table 2 (FIG. 5B) in the LAN transmitter 47. If the PC 51 has a fixed private IP address, there is no need of notifying the gateway 40 of the same. Instead, the private IP address and the corresponding telephone number are registered in the table 2 beforehand.

The PC 51 has, for example, a private IP address [p.p.p.p]. An outgoing call from the PC 51 is received by the LAN receiver 44, which requests the LAN transmitter 47 to make a call as shown in FIG. 7. At this time, the LAN transmitter 47 retrieves the telephone number [3000] from the table 2 according to the private IP address [p.p.p.p]. Then, the LAN transmitter 47 transmits, as a caller address, the IP address [g.g.g.g] assigned to the gateway 40 plus the telephone number [3000] to the PC 55 or gateway 52 having an IP address [b.b.b.b].

In this way, an outgoing call from the PC 51 having an IP address allocated by the DHCP server or a private IP address instead of a global IP address is handled by the gateway 40 so that the call may accompany the global IP address assigned to the gateway 40 and the telephone number corresponding to the PC 51. The present invention enables any PC having a private IP address to issue an internet telephone call to the outside and enables a receiver of the call to make a callback with the use of the global IP address [g.g.g.g] of the gateway 40 and the telephone number [3000] attached to the call.

Figure 10:
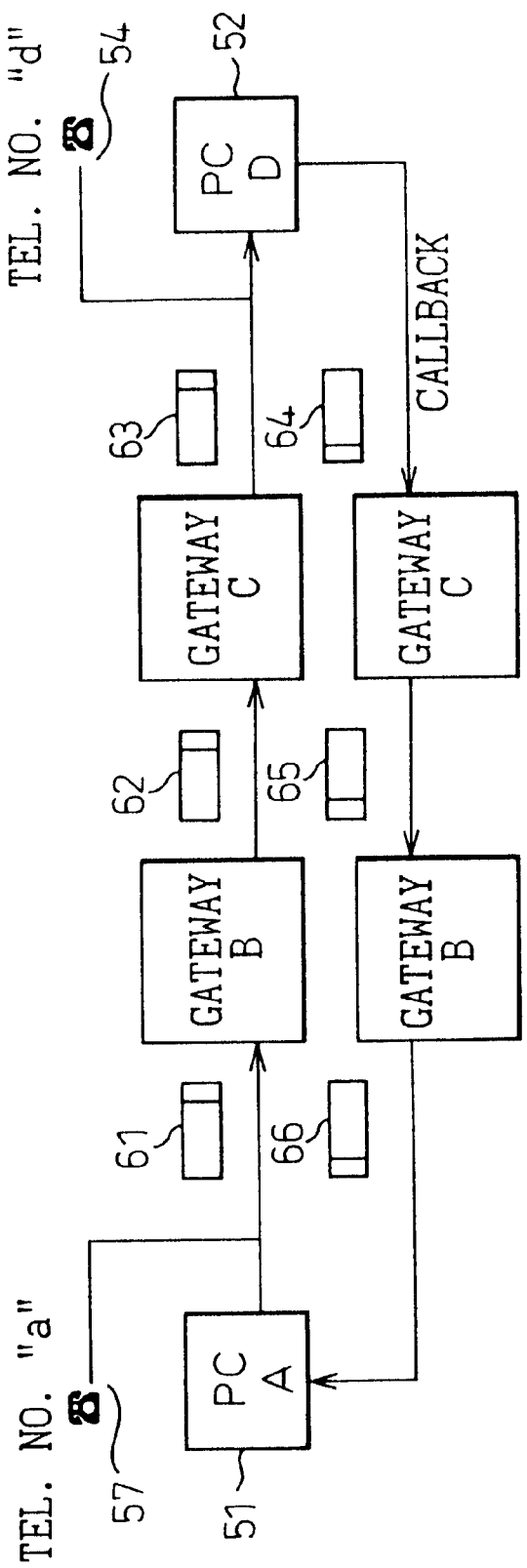
FIG. 10 shows data transferred among units in an internet telephone system.

FIG. 10 shows data transferred among units in an internet telephone system.

Figure 11:
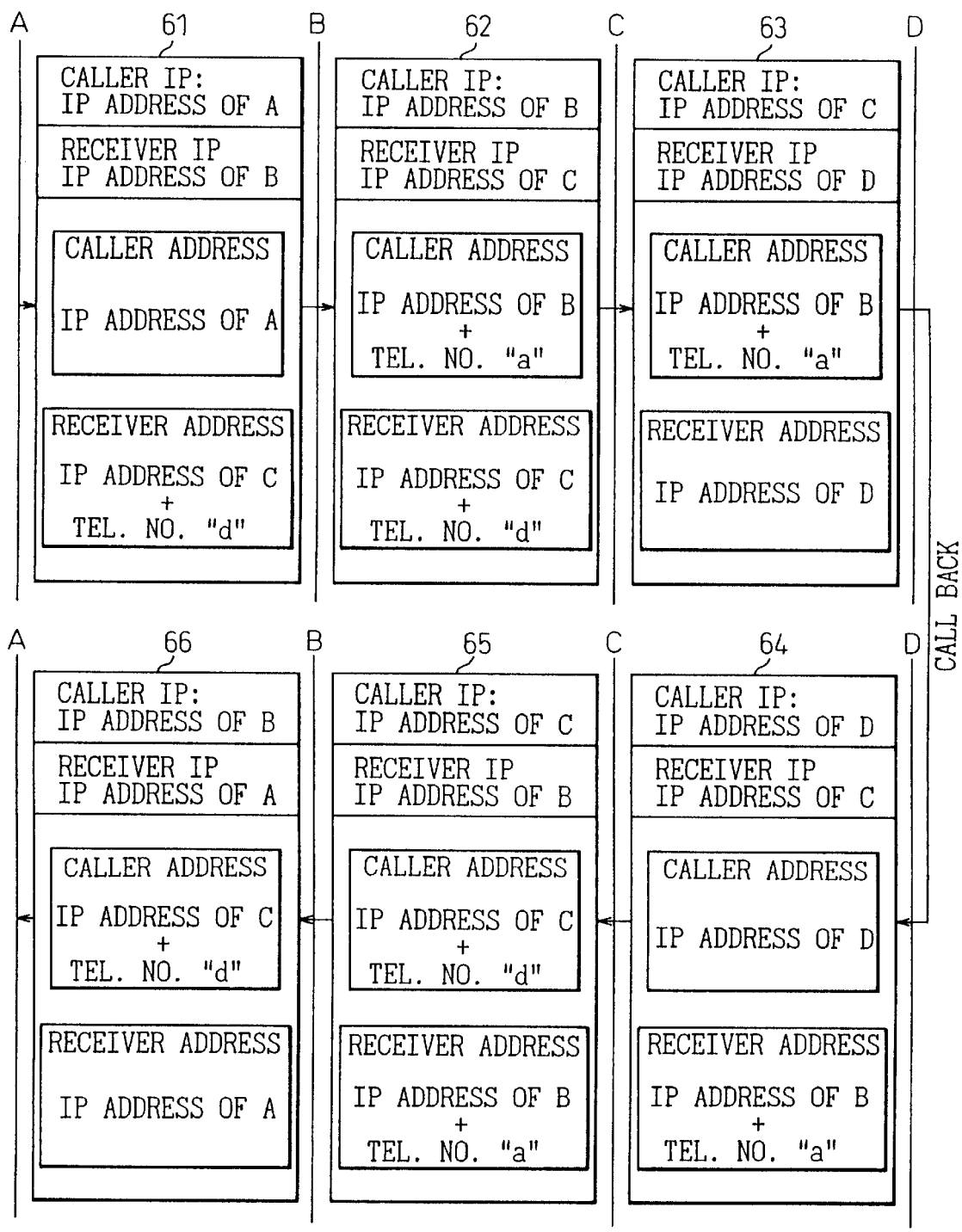
FIG. 11 shows examples of data transferred in the system of FIG. 10.

FIG. 11 shows examples of data transferred according to the present invention in the system of FIG. 10.

In FIG. 10, a PC A (51) is linked to a telephone 57 having a telephone number "a" and a PC D (52) to a telephone 54 having a telephone number "d." The PCs A and D have no fixed global IP addresses.

In FIG. 11, IP packets 61 to 66 are transferred between the PCs A and D. In each of the packets, "Caller IP" and "Receiver IP" are in a header field and "Caller address" and "Receiver address" are in a data field. The "Caller IP" and "Receiver IP" contain IP addresses assigned to a caller and receiver that are directly connected to each other. The "Caller address" contains information to identify the caller, i.e., the PC A. The "Receiver address" contains information to identify the receiver, i.e., the telephone 54 or PC D connected to a gateway C.

The packet 61 is transmitted from the caller PC A to a caller gateway B and contains the IP address of the PC A in "Caller address" and the IP address of the receiver gateway C and the receiver telephone number d in "Receiver address." As shown in FIG. 9, the gateway B retrieves the telephone number "a" from the table 2 according to the IP address of the PC A and replaces the data in "Caller address" with the IP address of the gateway B plus the telephone number "a", thereby preparing the packet 62.

As shown in FIG. 8, the gateway C retrieves the PC D from the table 1 according to the receiver telephone number "d" and checks to see if the PC D is in a reception enabled state. If it is in the reception enabled state, the gateway C transmits the packet 63 with "Receiver address" having the IP address of the PC D. When the PC D makes a callback to the PC A, the received "Caller address" containing the IP address of the gateway B plus the telephone number "a" is written in "Receiver address" to prepare the packet 64. Thereafter, the sequences of FIGS. 8 and 9 are carried out to call back the PC A.

FIGS. 12A and 12B are a flowchart showing the operation of the LAN receiver 44 of the gateway 40 according to the present invention.

Figure 13:
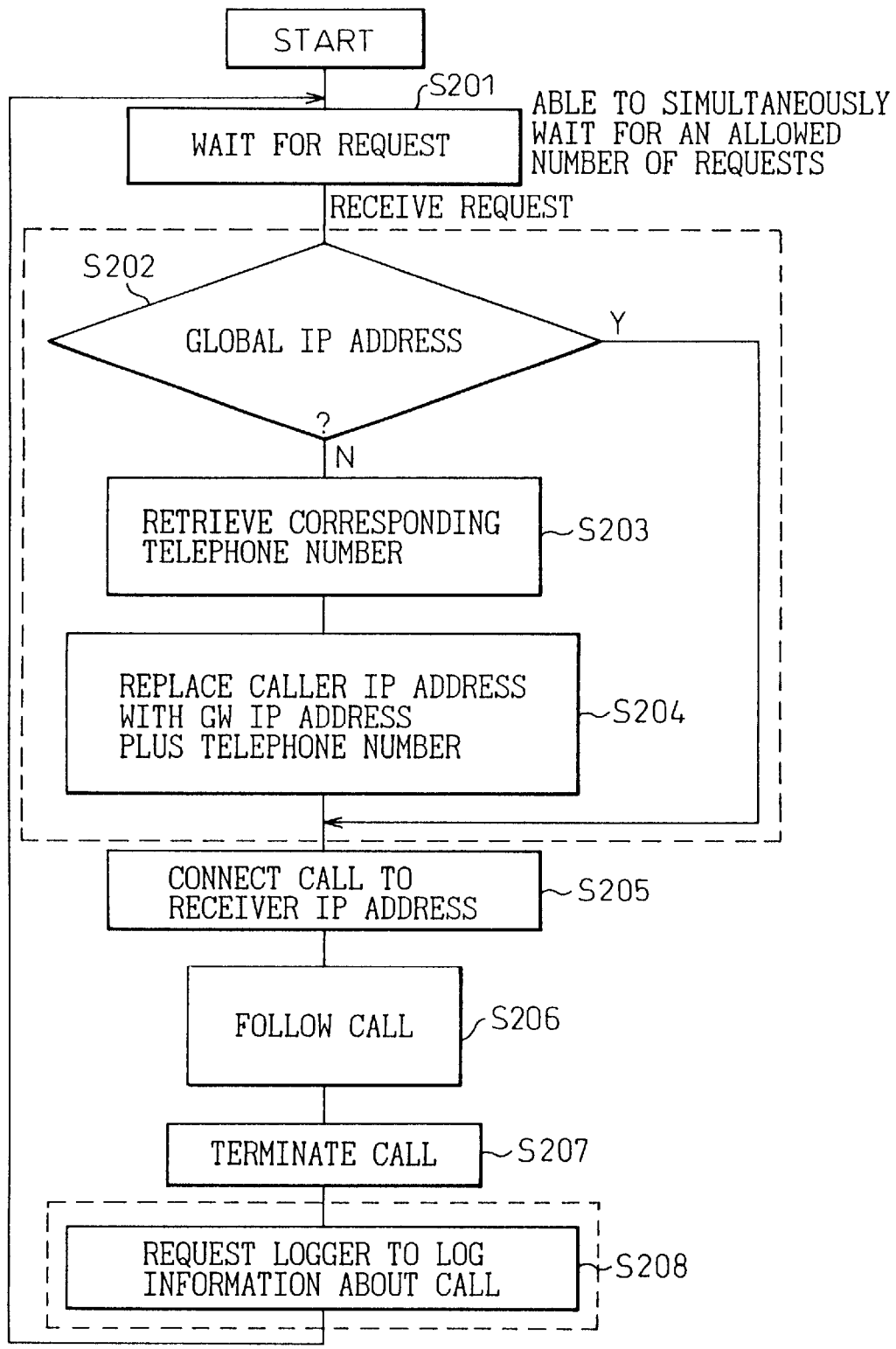
FIG. 13 shows a process flow of a LAN transmitter of the gateway of FIG. 4.

FIG. 13 is a flowchart showing the operation of the LAN transmitter 47 of the gateway 40 according to the present invention.

Figure 14:
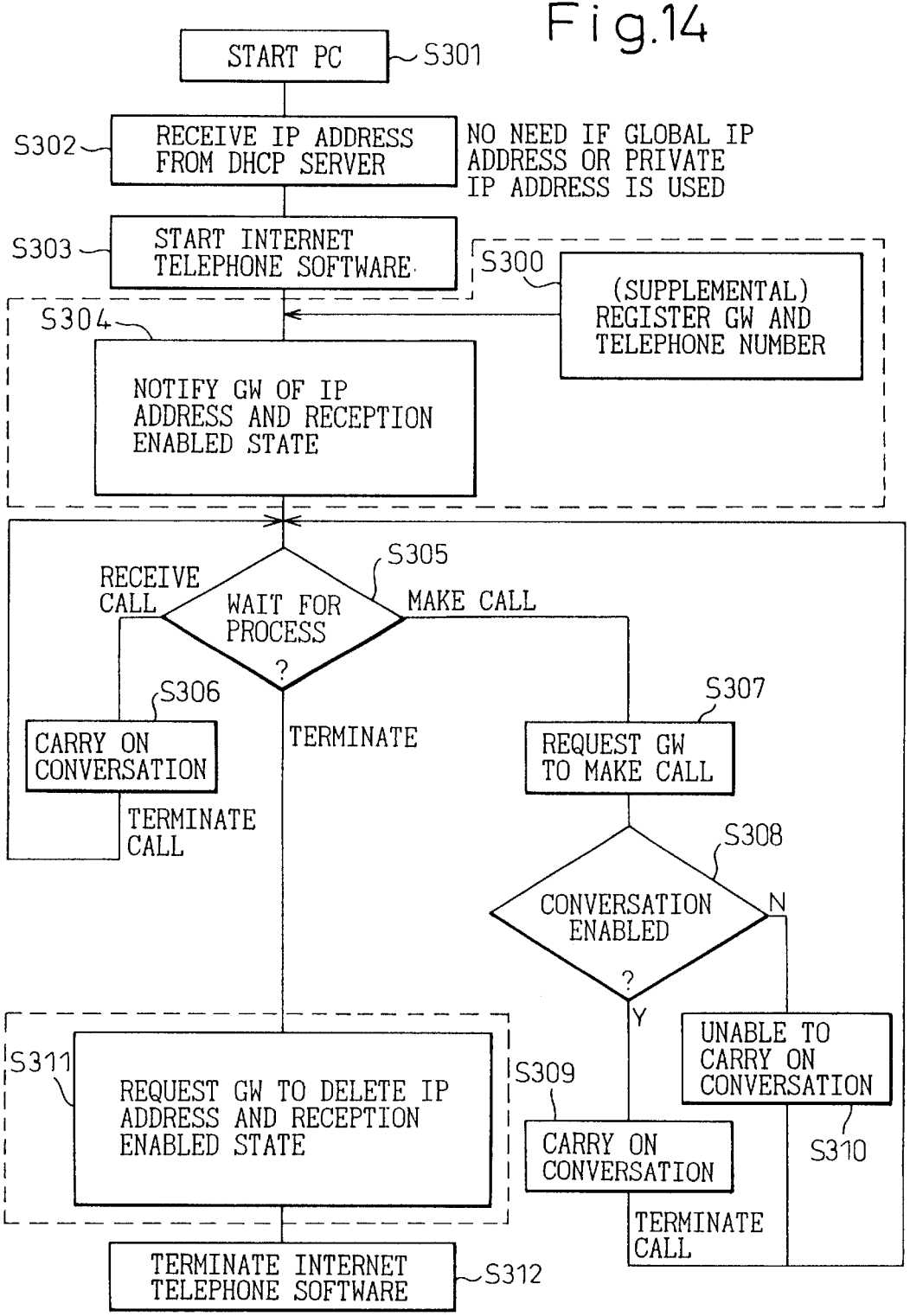
FIG. 14 shows a process flow of a PC connected to the gateway of FIG. 4.

FIG. 14 is a flowchart showing steps to be taken by a PC when starting internet telephone software according to the present invention.

In each of the flowcharts, a part related to the present invention is surrounded with a dotted line to separate it from parts related to the prior art.

In steps S101 to S103 of FIG. 12A, the LAN receiver 44 receives an incoming call from a LAN, authenticates a user of the call, and determines whether a receiver address contained in the call is an IP address or a telephone number. If it is an IP address (below the dotted line of FIG. 7), the LAN receiver 44 requests the LAN transmitter 47 to make a call and follows the call in steps S116 to S118. If the receiver address is a telephone number that is outside the domain of the gateway 40 (above the dotted line of FIG. 7), the LAN receiver 44 retrieves an IP address assigned to a gateway that controls the telephone number from the retrieval unit 42, requests the LAN transmitter 47 to make a call, and follows the call in steps S112 to S115.

If the receiver address is a telephone number that is within the domain of the gateway 40 (FIG. 8), the LAN receiver 44 retrieves a PC corresponding to the telephone number from the table 1 and determines whether or not the PC is in a reception enabled state in step S105. If the PC is in the reception enabled state, the LAN receiver 44 requests the LAN transmitter 47 to make a call according to the retrieved IP address of the PC, and follows the call in steps S109 to S111. If the PC is not in the reception enabled state, the LAN receiver 44 requests the line transmitter 48 to make a call to the telephone number as shown in FIG. 6 in steps S106 to S108.

In FIG. 13, the LAN transmitter 47 receives a call request from the LAN receiver 44 and checks to see if an IP address assigned to a caller is a fixed global IP address in steps S201 and S202. If it is not the global IP address (FIG. 9), the LAN transmitter 47 retrieves a telephone number corresponding to the caller IP address from the table 2 and replaces the caller IP address with the IP address of the caller gateway plus the corresponding telephone number in steps S203 and S204. If the caller IP address is the fixed global IP address, it is used as it is. Thereafter, the LAN transmitter 47 proceeds with a call process in steps S205 to S207. After the completion of the call, the LAN transmitter 47 requests the logger 49 to log information about the call in step S208.

In FIG. 14, a PC is turned on and acquires an IP address from the DHCP server in steps S301 and S302. If the PC is provided with a fixed global IP address or private IP address, step S302 is not necessary. The PC notifies the gateway 40 of a corresponding telephone number, the acquired IP address, and a reception enabled/disabled state before or after starting internet telephone software in steps S303 and S304. Before staring the software, the gateway 40 and the corresponding telephone number must be written in the software in step S300.

According to the notification from the PC, the gateway 40 registers necessary information in the tables 1 (FIG. 5A) and 2 (FIG. 5B). Steps S305 to S310 that follow are the same as those of standard internet telephone software. When the software is terminated, the PC may notify the gateway 40 of a reception disabled state and a deletion of the IP address assigned to the PC in step S311. This step S311 is not essential because the gateway 40 transfers a call to the corresponding telephone if the PC returns no answer.

FIG. 15 shows a CATV station employing the gateway 40 of the present invention.

The CATV station incorporates the gateway 40 of the present invention, a private telephone exchange 71 such as a PBX, and a CAM (Communication Access Master) 72. The CAM 72 is a server to carry out data communication through CATV transmission lines. A subscriber has a PC 51 and a corresponding telephone 57 that are connected to the CAM 72 through a cable. The PC 51 and telephone 57 are connected to a CAU (Communication Access Unit) 73 having a 10BASE-T interface and an analog telephone interface.

The PC 51 transmits and receives (81 and 82) internet telephone signals through the CAM 72 and the LAN interface of the gateway 40, or through the CAU 73 and the line interface of the gateway 40. To use the internet telephone system through the CAU 73, i.e., to achieve a so-called CATV telephone, the CAU 73 is connected to the PC 51 and telephone 57 so that an IP address assigned to the PC 51 is uniquely related to the telephone number of the telephone 57. Namely, the above-mentioned forms of use of the gateway 40 of the present invention for the internet telephone system are applicable as they are to the CATV telephone system. A standard CATV network usually employs IP addresses provided by a DHCP server or private IP addresses, and therefore, the gateway 40 of the present invention is effective to the CATV telephone system.

As explained above, the present invention has the following advantages:

1) The present invention passes all internet telephone calls made by PCs through the gateway of the present invention and, therefore, the gateway can centrally collect information about the calls. This is useful for a manager who controls the PCs and gateway.

2) Standard telephones are advantageous in that they are ready to accept calls all the time if they are not busy. Internet telephone software on PCs is advantageous in that users can carry on conversations while sharing information displayed on the PCs. The present invention is practical because it preferentially connects a call to a PC if the PC is in a reception enabled state.

3) The present invention authenticates a sender of a call in a sender gateway. Authentication of a receiver of the call is carried out in a receiver gateway. Accordingly, the sender gateway may keep only information about the receiver gateway and is not required to keep information about all the PCs that are in the domain of the receiver gateway. This reduces the quantity of authentication data to be stored in each gateway and labor for maintenance of the gateways.

4) The present invention enables a PC having an IP address assigned by a DHCP server or a private IP address instead of a fixed global IP address to send and receive internet telephone calls.

5) The present invention enables a PC to make a callback to an internet telephone call made by a PC having an IP address assigned by a DHCP server or a private IP address instead of a fixed global IP address.

6) The present invention writes information about a PC into the gateway of the present invention whenever the PC starts internet telephone software. If an IP address assigned to the PC or a telephone number related to the PC is changed, the information about the PC written in the gateway is automatically updated by updating the information on the PC.

What is claimed is:

1. A gateway for an internet telephone system to which one or more terminals having respective telephone numbers and IP addresses assigned by implementing a DHCP are connected within the domain of the gateway, comprising:

a registration table for translating between a telephone number and an IP address, both of which are assigned to one of the one or more terminals;

a retrieving means for retrieving the telephone number from the registration table based on the IP address of an originating terminal, and retrieving the IP address of a destination terminal from the registration table based on a telephone number included in a received IP packet;

a transmitting means for transmitting outside of the domain an IP packer including the retrieved telephone number of the originating terminal; and a receiving means for receiving from outside of the domain an IP packet including a telephone number, and specifying a destination terminal of the received IP packet from the retrieved IP address of the destination terminal.

2. The gateway according to claim 1, further comprising a means for logging information about the call.

3. A gateway for an internet telephone system, comprising:

a LAN receiver for processing an incoming call from the Internet or a personal computer;

a line receiver for processing an incoming call from a telephone;

a LAN transmitter for processing an outgoing call to the Internet or a personal computer according to a request from the line receiver;

a line transmitter for processing an outgoing call to a telephone according to a request from the LAN receiver;

a retrieval unit for retrieving the address of a receiver gateway according to a request from the line receiver; and a logger for logging information about calls according to requests from the LAN transmitter and line transmitter, wherein, if the LAN receiver receives an incoming call from a LAN and if the incoming call accompanies a receiver IP address,:

the LAN receiver requests the LAN transmitter to make a call based on the incoming call; and the LAN transmitter requests the logger to log information about the call; wherein:

the LAN receiver has a first table for registering IP addresses assigned to personal computers that are within the domain of the gateway, telephone numbers related to the personal computers, and reception enabled/disabled states of the personal computers; and if the LAN receiver receives an incoming call from a LAN and if the incoming call accompanies a receiver telephone number that is within the domain of the gateway, the LAN receiver retrieves an IP address from the first table according to the receiver telephone number, and if a personal computer having the retrieved IP address is in a reception enabled state, requests the LAN transmitter to make a call based on the incoming call and the retrieved IP address.

4. The gateway of claim 3, wherein an IP address assigned to any personal computer that is within the domain of the gateway is one provided by a DHCP server or a private IP address.

5. The gateway of claim 4, wherein each personal computer within the domain of the gateway notifies the gateway of the enabled/disabled state of internet telephone software whenever the personal computer starts or stops the software so that the gateway may register the enable/disabled state in the first table.

6. The gateway of claim 4, wherein each personal computer within the domain of the gateway notifies the gateway of an IP address and a corresponding telephone number whenever the IP address is assigned to the personal computer so that the gateway may register the IP address and telephone number in the second table.

7. The gateway of claim 4, wherein each personal computer within the domain of the gateway notifies the gateway of an IP address and a corresponding telephone number whenever the IP address is assigned to the personal computer so that the gateway may register the IP address and telephone number in the first table.

8. The gateway of claim 7, wherein each personal computer within the domain of the gateway notifies the gateway of the enabled/disabled state of internet telephone software whenever the personal computer starts or stops the software so that the gateway may register the enabled/disabled state in the first table.

9. The gateway of claim 7, wherein an IP address to be assigned to a personal computer is one assigned by a DHCP server or a private IP address.

10. The gateway of claim 3, wherein, if the personal computer is in the reception disabled state or fails to receive the call, the LAN receiver requests the line transmitter to make a call based on the incoming call and accompanied receiver telephone number.

11. The gateway of claim 3, wherein an IP address to be assigned to a personal computer that is within the domain of the gateway is one assigned by a DHCP server or a private IP address.

12. The gateway of claim 11, wherein each personal computer within the domain of the gateway notifies the gateway of the enabled/disabled state of internet telephone software whenever the personal computer starts or stops the software so that the gateway may register the enabled/disabled state in the first table.

13. The gateway of claim 11, wherein each personal computer within the domain of the gateway notifies the gateway of an IP address and a corresponding telephone number whenever the IP address is assigned to the personal computer so that the gateway may register the IP address and telephone number in the second table.

14. The gateway of claim 11, wherein each personal computer within the domain of the gateway notifies the gateway of an IP address and a corresponding telephone number whenever the IP address is assigned to the personal computer so that the gateway may register the IP address and telephone number in the first table.

15. The gateway of claim 14, wherein each personal computer within the domain of the gateway notifies the gateway on the enabled/disabled state of internet telephone software whenever the personal computer starts or stops the software so that the gateway may register the enabled/disabled state in the first table.

16. The gateway of claim 14, wherein an IP address to be assigned to a personal computer is one assigned by a DHCP server or a private IP address.

17. A gateway for an internet telephone system, comprising:
 a LAN receiver for processing an incoming call from the Internet or a personal computer;
 a line receiver for processing an incoming call from a telephone;
 a LAN transmitter for processing an outgoing call to the Internet or a personal computer according to a request from the line receiver;
 a line transmitter for processing an outgoing call to a telephone according to a request from the LAN receiver;
 a retrieval unit for retrieving the address of a receiver gateway according to a request from the line receiver; and
 a logger for logging information about calls according to requests from the LAN transmitter and line transmitter, wherein, if the LAN receiver receives an incoming call from a LAN and if the incoming call accompanies a receiver IP address,:
 the LAN receiver requests the LAN transmitter to make a call based on the incoming call; and
 the LAN transmitter requests the logger to log information about the call; wherein:
 the LAN transmitter has a second table for registering IP addresses assigned to personal computers that are within the domain of the gateway and telephone numbers related to the personal computers; and,
 if the LAN transmitter receives a call request from the LAN receiver and if the call request accompanies a caller IP address that is not a global IP address, the LAN transmitter retrieves a telephone number corresponding to the caller IP address from the second table and replaces the caller IP address with an IP address assigned to the gateway plus the retrieved number.

18. The gateway of claim 17, wherein every outgoing call from the personal computers is made through the gateway.

* * * * *